Feb. 23, 1960                    J. GORBY                    2,926,095
METHOD AND APPARATUS FOR CANNING FISH
Filed April 20, 1953                                    4 Sheets-Sheet 1

INVENTOR.
JACK GORBY
BY
ATTORNEY

Feb. 23, 1960　　　　　　　J. GORBY　　　　　　2,926,095
METHOD AND APPARATUS FOR CANNING FISH
Filed April 20, 1953　　　　　　　　　　　　4 Sheets-Sheet 2
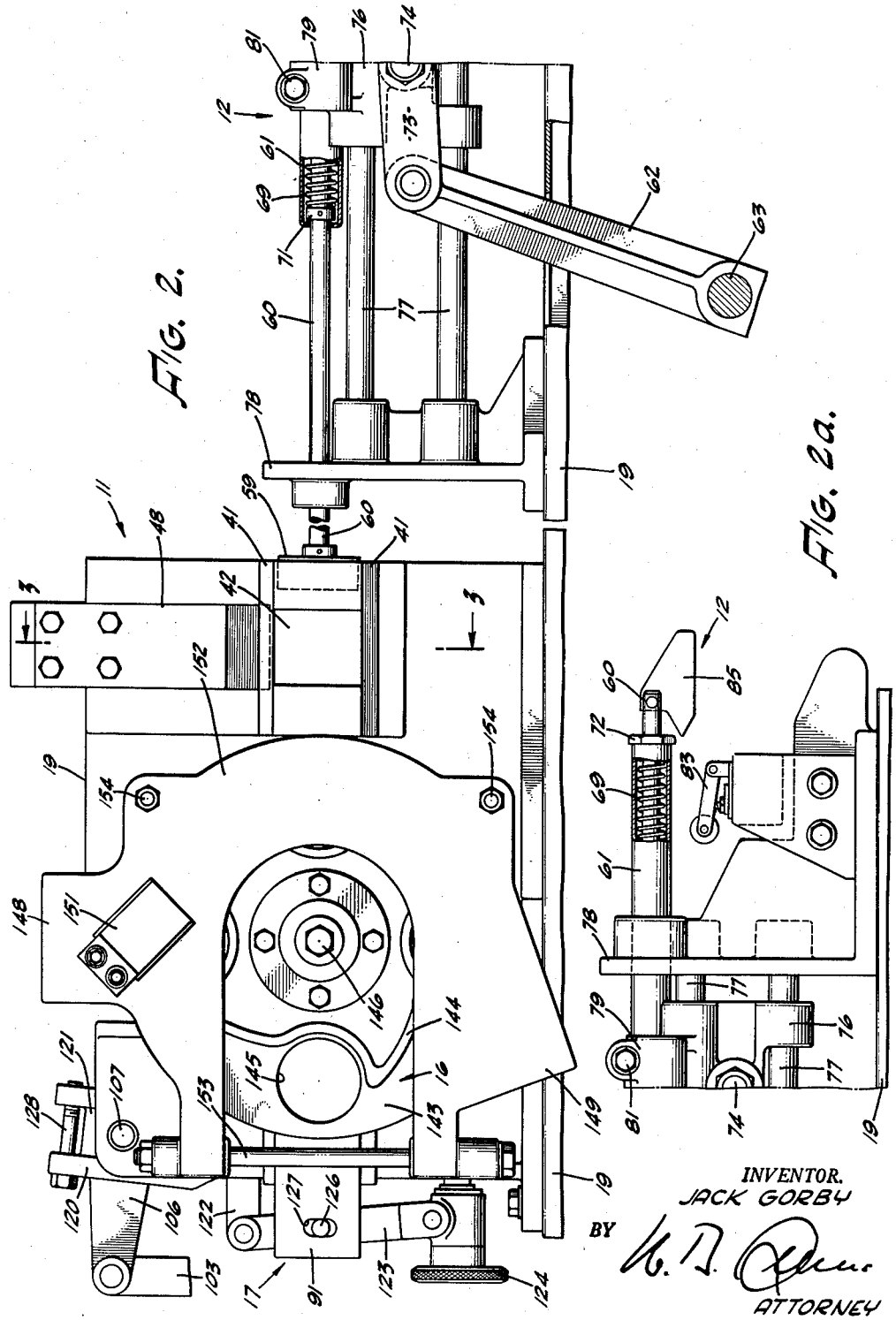
INVENTOR.
JACK GORBY
BY
ATTORNEY

INVENTOR.
JACK GORBY

Feb. 23, 1960   J. GORBY   2,926,095
METHOD AND APPARATUS FOR CANNING FISH
Filed April 20, 1953   4 Sheets-Sheet 4
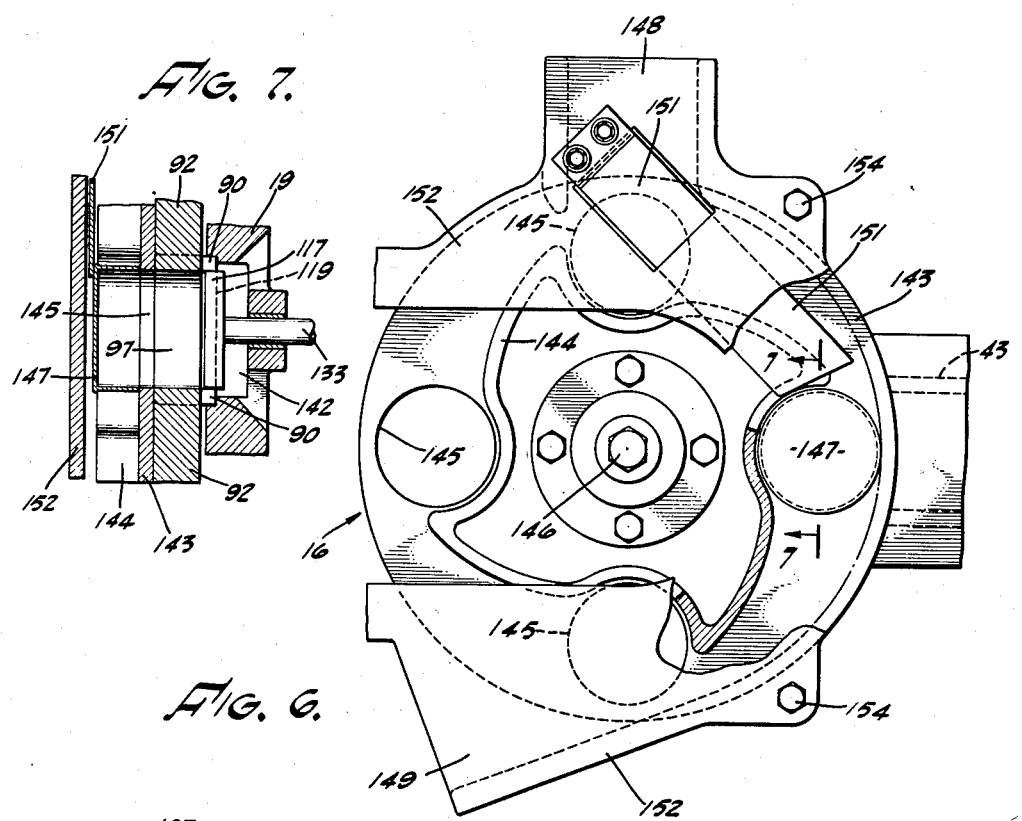
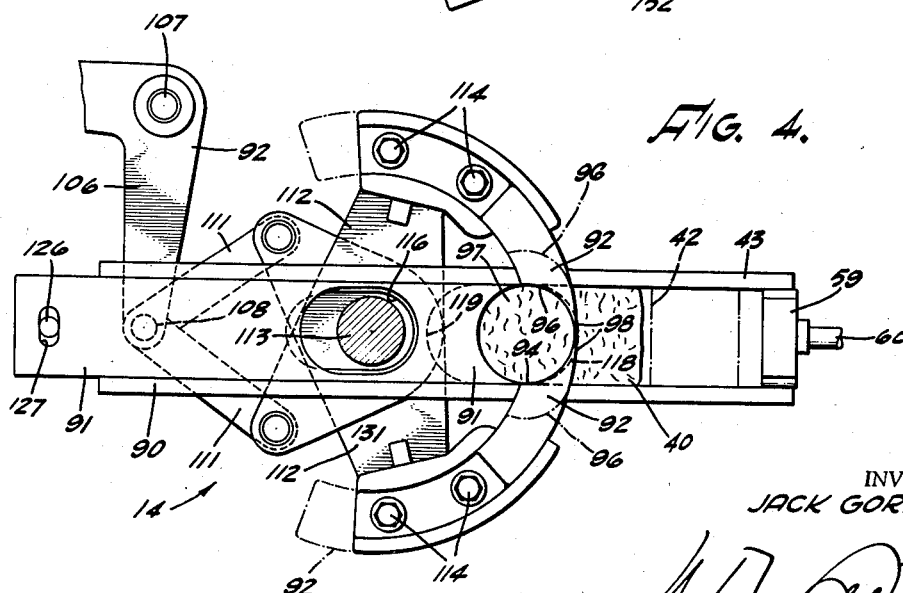
INVENTOR
JACK GORBY
BY
ATTORNEY United States Patent Office 2,926,095
Patented Feb. 23, 1960

2,926,095
METHOD AND APPARATUS FOR CANNING FISH

Jack Gorby, Los Angeles, Calif., assignor to Keystone Packing Machine Corp., a corporation of California Application April 20, 1953, Serial No. 349,653

33 Claims. (Cl. 99—188)

This invention relates to a method and apparatus for canning fish, and particularly to the automatic filling of relatively small cylindrical cans with chunk tuna fish.

In the merchandising of cooked tuna fish in cans, grading and value are largely determined by the size and proportion of naturally adhering pieces of the original fillet. While unmutilated whole fillets would command superior market prices, these are rarely packed since an unusual shape of receptacle would be required and individual manual handling would be essential. Accordingly, canned tuna in chunk form, in which each receptacle contains a preponderance of solid pieces of the fillet, constitutes the most generally available top quality product. In chunk tuna the superiority of one pack over another is determined by the size and quantity of pieces or chunks in each receptacle, so that grading declines in proportion to the amount of small bits or fragments in each can. The lower qualities of canned tuna, constituting these bits and fragments, are sold under the title of grated or shredded tuna and command only an inferior sales price.

Because of these marketing conditions, tuna packers have long sought to increase the yield of chunk packs and to minimize residual material packaged as shredded. However, factors other than the packaging of tuna in chunks, with a minimum of shreads or bits, are also important in mechanical packaging methods. It is highly important that a predetermined weight and volume of fish be packed in each can, and it is also important that the arrangement of the fish in the can be such as to provide ample space for the requisite oils and condiments. In addition, the fish should be packed without extended contact with the can walls in order to prevent scorching during processing operations subsequent to the filling of the cans.

In view of the above problems characterizing the field of tuna fish packing, it is an object of the present invention to provide a method and apparatus adapted to automatically deposit chunks of tuna fish in cans without substantial breaking of the chunks into fragments.

Another object of the invention is to provide a charge-forming apparatus for shaping predetermined quantities of tuna fish into short cylinders without crushing or breaking the chunks into small particles.

A further object of the invention is to provide a novel control and feeding method and apparatus for delivering the fish to the charge-forming apparatus without crowding or mutilating it, yet which insures that there will always be sufficient fish present to form a charge.

These and other objects and advantages of the invention will be more fully set forth in the following specification and claims, considered in connection with the attached drawings to which they relate.

In the drawings:

Figure 1 is a schematic diagram illustrating the various mechanical and electrical components of an apparatus constructed in accordance with the invention;

Figures 2 and 2a combine to illustrate a side elevation of the present apparatus;

Figure 4 is a side view illustrating the charge-forming apparatus in closed condition;

Figures 1, 5:
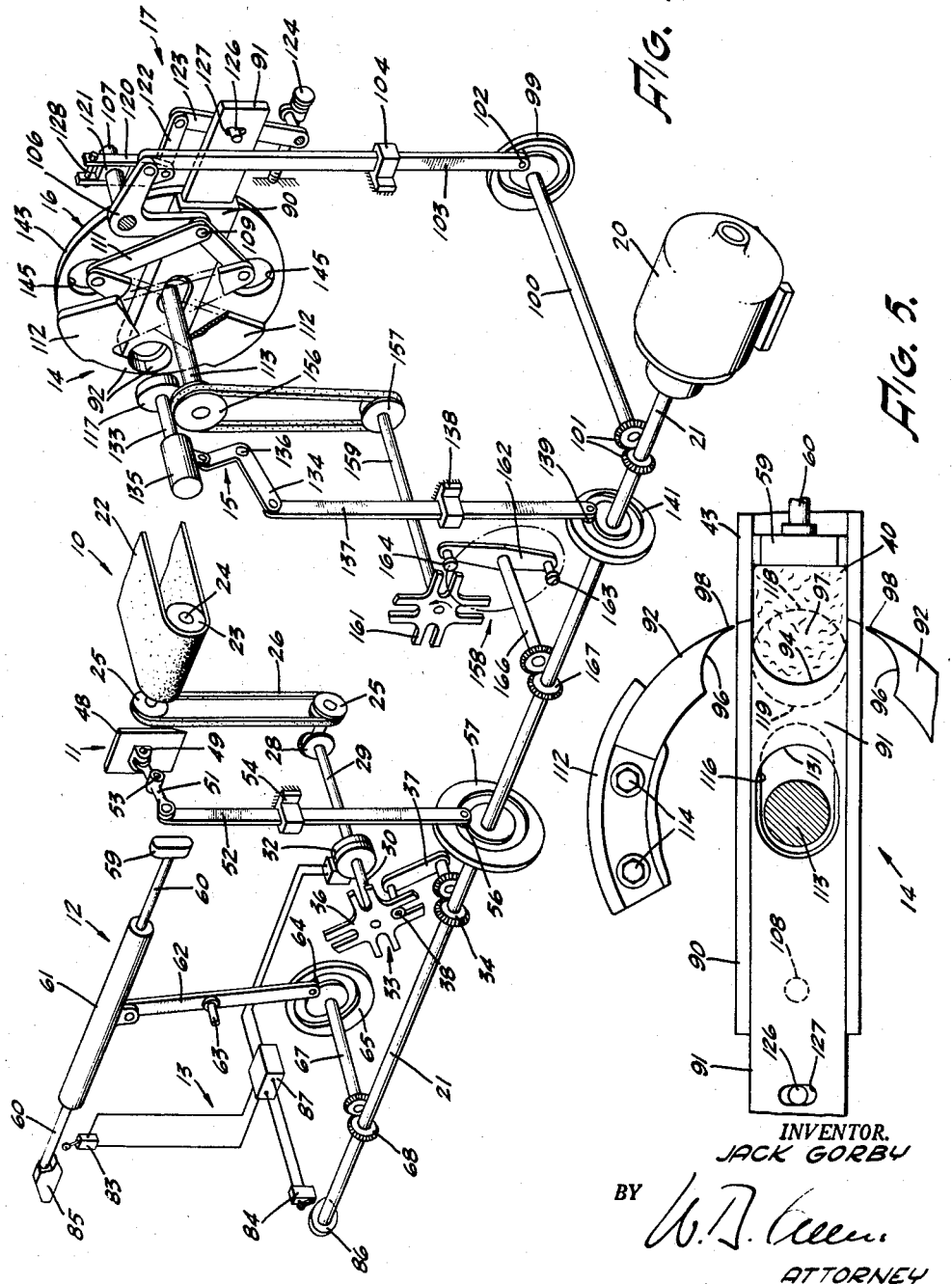
Figure 8:
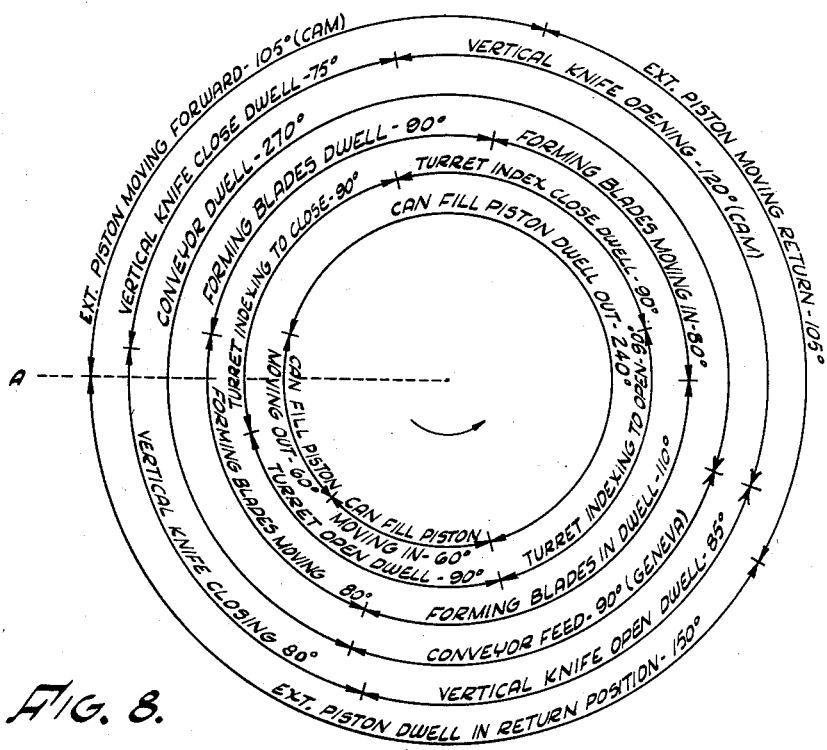

Figure 5 corresponds generally to Figure 4 but illustrates the charge-forming apparatus in open condition;

Figure 6 is an elevational view of the can-holding turret, with portions broken away to better illustrate the structure;

Figure 7 is a vertical sectional view along line 7—7 of Figure 6 with the forming blade in the closed position of Figure 4; and Figure 8 is a time chart or diagram illustrating the sequence of operations of the various units making up the present apparatus.

Referring first to Figure 1 of the drawings, the apparatus for performing the invention may be seen to comprise generally a conveyor apparatus 10, a vertical knife mechanism 11 for separating predetermined masses of tuna fish from the fillets on the conveyor 10, an extrusion piston mechanism 12 for shifting or transferirng the masses after their separation by knife 11, and an electrical control system 13 for governing the operation of conveyor 10 in accordance with the requirements of the charge-forming and can-filling portions of the apparatus. The charge-forming mechanism is denoted generally by the reference character 14, the can-filling mechanism by the reference character 15, and a can-holding turret by the reference character 16. An important feature of the invention is the adjustable linkage means 17 for operating certain portions of the charge-forming mechanism 14 in such a way that the amount of fish in each charge is maintained at a suitable value obviating crushing of the fish.

All of the above elements are mounted in a suitable frame or casting 19 shown fragmentarily in Figures 2, 2a, 3 and 7. Furthermore, all of the mechanical components of the apparatus are driven in timed relation by a suitable motor 20 adapted to drive a common cam and gear shaft 21 at a speed providing the desired rate of can filling. In the present apparatus the various elements are constructed so that the common drive shaft 21 rotates one revolution for each can packed in accordance with the invention.

Figure 3:
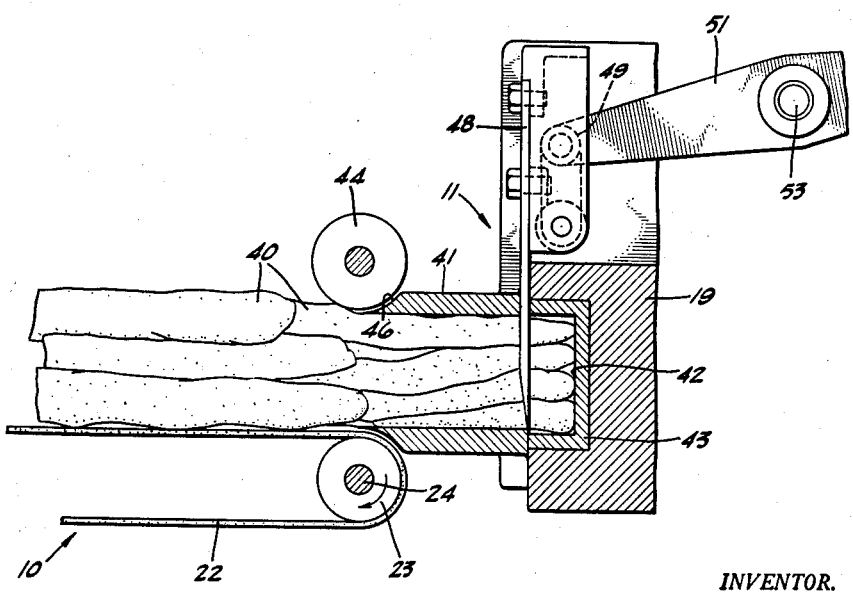
Figure 3 is a vertical sectional view along line 3—3 of Figure 2 and illustrating the vertical knife and charge-segregating mechanism.

Referring first to the conveyor mechanism 10 illustrated in Figures 1 and 3, it is shown to comprise a continuous belt 22 supported on suitable rollers, including a feed roll 23. Feed roll 23 is mounted on a shaft 24 for driving by a pair of pulleys 25 and cooperating belt 26. The driving one of pulleys 25 is connected through suitable bevel gearing 28 to a shaft 29 adapted to be intermittently connected to a corresponding shaft 30 by means of a suitable automatic clutch 32, preferably of the electromagnetic variety. Shaft 30 is, in turn, driven through a suitable intermittent drive 33 by bevel gears 34 associated with the main drive shaft 21. The intermittent drive 33 is shown schematically to comprise a four star Geneva wheel 36 which is operatively associated with a single arm 37 and pin 38 connected to the driven of bevel gears 34.

Referring to the time diagram of Figure 8, which may be thought of as mounted on shaft 21, the intermittent drive 33 and associated gearing is such that shaft 30 turns but a quarter revolution for the first quarter of each full revolution of main drive shaft 21, and is stationary for the remaining three quarters of each revolution of shaft 21. This quarter turn of shaft 30 operates, when electromagnetic clutch 32 is closed, to rotate shaft 29 a corresponding amount and thus effect feeding of fish positioned on conveyor belt 22. As will be described in detail subsequently, the ratios of gears 28 and pulleys 25 are such that the amount of fish fed by belt 22 is slightly greater than the capacity of the charge-forming apparatus 14, so that the feeding of fish will be periodically interrupted through operation of clutch 32 as determined by the electrical control system 13.

It is to be understood that the showing of the conveyor elements 22 and 23 is merely illustrative of a suitable conveyor such as the one shown and described in United States Patent 2,542,133, issued to the present inventor on February 20, 1951, for an Apparatus and Method for Canning Fish. As is there described in detail, the tuna fillets 40 are piled on belt 22 parallel to each other and with the fish fibers extending longitudinally of the belt. From belt 22 the fillets are fed into a suitable entrance chute 41 which is registered with a receiving chamber 42 shown in Figures 2-4. Receiving chamber 42 is illustrated as formed in a stationary channel member 43 which is mounted in a corresponding horizontal slot in frame 19 of the machine. It is to be understood that the front face of channel 43 is normally covered by suitable face plates or other components along all except the opening to chamber 42, the construction being such that channel 43 may be readily removed for cleaning purposes. A stationary passage, of rectangular section, is thus formed through which the masses of fish are transferred to forming mechanism 14.

It is a feature of the invention that a roller 44 is mounted at the outer upper portion of chute 41 as shown in Figure 3, and is driven from motor 20 by a suitable drive, not shown. The roller 44 cooperates with a correspondingly curved lip 46 at the upper portion of chute 41 to assure that the tuna fillets 40 enter the chute properly, and its use permits the fillets to be piled sufficiently high to substantially fill chamber 42. The quantity of fish in chamber 42 is therefore substantially the same for each leveling operation. The use of a motor-driven roll 44, instead of a mere idler, provides a more effective action to assure the entering of the fish 40 into chute 41 without any catching, tearing, or damage to the fillets.

The amount of feeding of belt 22 during each full revolution of main drive shaft 21, and resulting quarter revolution of connected shafts 30 and 29, is sufficient to precisely fill the chamber 42 in stationary channel 43. The fish mass in chamber 42 is then separated, transversely of the fish fibers, from the remaining fish on the belt 22 by means of vertical knife mechanism 11. This mechanism comprises a knife blade 48 (Figures 1-3) adapted to descend between the inner end of chute 41 and the corresponding edges of channel 43 to completely block the entrance to chamber 42. The knife blade is pivotally connected at 49 to the free end of a rocker arm 51, the other end of which is pivotally connected to a vertical connecting rod 52. The rocker arm 51 is centrally pivoted at 53 to a stationary element such as frame 19 of the apparatus. Connecting rod 52 extends, through a suitable bearing 54 in machine frame 19, from rocker 51 to a cam follower 56 driven by a positive cam 57 on drive shaft 21. Referring again to Figure 8, the cam 57 is preferably constructed so that the vertical knife blade 48 dwells in its upper or open position for eighty-five degrees, closes for eighty degrees, dwells in its closed or lower position for seventy-five degrees, and opens for one hundred and twenty degrees to account for a full revolution of drive shaft 21.

A predetermined mass of fish being disposed in chamber 42 and severed by knife blade 48, the extrusion piston mechanism 12 becomes operative to transfer the severed fish along channel 43 to the charge-forming mechanism 14. The mechanism 12 comprises a piston head 59 of substantially rectangular shape corresponding generally to that of channel 43. Piston head 59 is mounted in channel 43 on a horizontal shaft 60 which is actuated through a constant pressure cylinder 61 by a vertical connecting arm 62. As indicated in Figures 1 and 2, the arm 62 is pivotally connected at 63 to frame 19 and is provided at its lower end with a cam follower 64 associated with a positive cam 65. Cam 65 is mounted on a shaft 67 which is driven through cooperating bevel gears 68 from main shaft 21, the ratio of gears 68 being preferably one to one as in the case of the gears 34 for conveyor mechanism 10.

The details of the construction and relationship of shaft 60 to constant pressure cylinder 61 is indicated in Figures 2 and 2a, which show that the shaft is slidably mounted in cylinder 61 and is surrounded by a helical compression spring 69. The inner end of spring 69 abuts a nut 71 fixed to shaft 60, while the outer end of spring 69 seats on the end closure 72 of cylinder 61. It follows that when the piston head 59 engages an obstacle such as the fish mass in stationary channel 43, the substantially constant pressure of spring 69 will be exerted as distinguished from any positive or cam pressure.

Figures 2 and 2a further disclose the details of the conection between the upper end of vertical arm 62 and constant pressure cylinder 61, the showing of Figure 1 being only diagrammatic. In a preferred construction, the upper end of arm 62 is pivotally connected to a link 73 which in turn is pivotally connected at 74 to a slide carriage 76. The carriage 76 is reciprocated on its guide rods 77 as the arm 62 is pivoted due to the action of cam 65 and cam follower 64. The guide rods 77 are mounted between a pair of brackets 78 on the upper portion of frame 19, the brackets also serving as bearings for shaft 60. The connection between carriage 76 and constant pressure cylinder 61 comprises a split ring 79 having bolts 81 which may be loosened to permit shifting of cylinder 61 relative to the carriage, for adjustment of the initial position of piston head 59. With this construction the amount of free travel of piston 59, without engaging an obstruction which would stop the piston travel and bring the spring 69 into use, may be accurately adjusted in accordance with the requirements of the apparatus as will be described subsequently.

Referring again to the time diagram in Figure 8, the cam 65 is constructed so that the extrusion piston head 59 will dwell in its return position, that is to say the position outwardly adjacent chamber 42 as illustrated in Figures 2 and 4, for one hundred and fifty degrees. The piston 59 will then, when its path is unobstructed move forward for one hundred and five degrees to place the piston 59 adjacent the charge-forming mechanism as shown in Figure 5. It will then retract to the initial position shown in Figures 2 and 4 for the next one hundred and five degrees to complete a full revolution of drive shaft 21. Although the time and sequence diagram of Figure 8 thus shows the extrusion piston 59 to be moving forward until the return movement is started, in actual operation it is constant pressure cylinder 61 which moves forward under the influence of cam 65 and cam follower 64. The piston head 59 itself moves forward only until the fish previously positioned in receiving chamber 42 is transferred either into abutment with the charge-forming mechanism 14 or into abutment with fish previously disposed adjacent charge-forming mechanism 14, the piston then being held substantially stationary while the spring 69 absorbs the energy of the forwardly moving constant pressure cylinder 61. The substantially constant pressure of spring 69 is thus impressed on the fish adjacent charge-forming mechanism 14 both before and after the constant pressure cylinder 61 reaches its forward position indicated in the time diagram of Figure 8.

The electrical system 13 for controlling the operation of conveyor mechanism 10 comprises two limit switches 83 and 84 the former of which is adapted by a cam element 85 (Figure 2a) on the outer end of shaft 60, and the latter of which is suitably mounted for operation by a cam 86 on drive shaft 21. Limit switches 83 and 84 are independently connected to a suitable memory or time delay relay 87 as shown in Figure 1, the relay 87 being in turn connected to the electromagnetic clutch 32. The construction of the switches 83 and 84, and of relay 87, is such that when the system is energized by a suitable source of voltage, not shown, the engagement of cam 85 with limit switch 83 will immediately effect operation of clutch 32 to a closed position connecting shafts 29 and 30. This closed condition of clutch 32 will be maintained after disengagement of cam 85 from limit switch 83 and until cam 86 engages limit switch 84, at which time the relay 87 is operated to effect immediate opening of the clutch.

The cams 85 and 86, and the intermittent drive mechanism 33, are set with relation to each other and to their associated elements in such a way that the following sequence of events will occur. The constant pressure cylinder 61 will first be shifted forwardly until cam 85 at the outer end of shaft 60 engages limit switch 83, which will occur when piston head 59 is spaced from the end of the passage through channel 43 (Figure 5) a distance which corresponds approximately to the width of receiving chamber 42. As limit switch 83 is thus engaged, the clutch will be instantly closed as previously stated. However, this alone will not cause shifting of the conveyor belt 22 since the intermittent drive mechanism 33 is at this time in a dwell period. It is not until the cylinder 61, and thus piston 59, has been shifted to its outer position that the intermittent drive 33 becomes operative to rotate shafts 30 and 29 and thus drive conveyor belt 22 to place a fresh mass of fish in receiving chamber 42. As soon as the rotation of shafts 30 and 29 ceases due to disengagement of pin 38 from Geneva wheel 36 of intermittent drive 33, the cam 86 comes into engagement with limit switch 84 to open clutch 32 and set up the control for a new cycle of operation. The extrusion piston head 59 and shaft 60 are thus retracted to the positions shown in Figures 2 and 4 prior to the operation of conveyor belt 22, so that there is no obstruction to the loading of chamber 42 with a mass of fish. In addition, the clutch 32 is never operated when either of shafts 30 or 29 is turning and there is accordingly no clutch slippage with consequent wear and damage to the clutch facings.

Referring again to Figure 8, it will be noted that the conveyor belt 22 is operated when the knife blade 48 is open or elevated and the extrusion piston 59 in its retracted position. The knife 48 then closes to sever the fish in chamber 42 from the fish fillets 40 on conveyor belt 22. While the knife 48 is thus closed to block the entrance to chamber 42, the extrusion piston 59 transfers the fish, transversely of the fish fibers, from chamber 42 and along stationary channel 43, to the charge-forming apparatus 14. The extrusion piston 59 then retracts, and the knife 48 shifts to its upper position, prior to the operation of conveyor mechanism 10 to again fill the chamber 42.

As previously stated, the cam 85 is set so that it will engage limit switch 83 when piston head 59 is a distance from the end of channel 43 corresponding approximately to the width of chamber 42, or approximately one mass or charge of fish. It follows that when the amount of fish adjacent the forming mechanism 14 is greater than one fish charge, cam 85 will not engage limit switch 83 and the clutch 32 will not close. The feeding of fish is thus interrupted for one full revolution of shaft 21, since the operation of intermittent drive 33 has no effect with clutch 32 open, and the charge-forming apparatus 14 is permitted to catch up to the conveyor mechanism 10. According to the method of the invention the rate of feed of conveyor mechanism 10 is made slightly greater than the capacity of charge-forming apparatus 14 so that the amount of fish adjacent the charge-forming apparatus will increase each time until cam 85 no longer engages limit switch 83. In this manner, maintenance of an adequate but not excessive charge adjacent the charge-forming apparatus is assured regardless of slight variations of the amount of fish on conveyor belt 10 or other factors.

It is important to the invention that the capacity of charge-forming apparatus 14 be only slightly less, for each revolution of shaft 21, than the predetermined mass of fish fed into receiving chamber 42. It follows that clutch 32 will fail to close only once for a substantial number of operations of apparatus 14, and conveyor 10 will operate during the majority of revolutions of shaft 21. This is to be distinguished from a situation where a large mass is fed by conveyor 10 during one revolution of shaft 21, and the piston mechanism 12 and forming apparatus 14 then repeatedly operated, during subsequent shaft revolutions, until the large mass is used up. The latter situation is undesirable since repeated operation of piston 59 on the large fish mass tends to break down the chunks into bit form.

The structure and operation of the charge-forming apparatus 14 in shaping the fish in stationary channel 43 into the cylindrical charge to be placed in a can will next be described. Charge-forming apparatus 14, as shown best in Figures 4 and 5, comprises a movable channel 90 which is slidably mounted co-axially of stationary channel 43 in a horizontal slot in frame 19, a plunger 91 mounted in channel 90 opposite extrusion piston 59, and a pair of forming blades 92 respectively mounted above and below the contiguous portions of channels 90 and 43. The end surface 94 of plunger 91 is shaped as a semi-cylinder of a diameter equal to that of the desired fish charge. In addition, the forming blades 92 are formed with faces 96 which are respectively concave to form a quadrant of a cylinder, so that the faces 96 form a semi-cylinder when the forming blades are closed as illustrated in Figure 4. Plunger 91 and the forming blades 92 are all of a thickness which is substantially the same as the depth of the can to be filled. Since the channels 90 and 43 are also of this depth, the plunger 91 and blades 92 completely close the channels and form, when the blades approach the closed position shown in Figure 4, a forming chamber 97. The fish in forming chamber 97 is severed or segregated, longitudinally of the fish fibers, by the sharp outer edges 98 of forming blades 92 when the blades are pivoted from the open position of Figure 5 to the closed position of Figure 4. As this occurs, the fish in forming chamber 97 is isolated from the remaining fish mass and from the compressive effect of piston 59.

Referring again to Figure 1, the means for operating the forming blades 92, and also the movable channel 90 and the plunger 91, comprise a positive cam 99 mounted on a shaft 100 which is driven by meshing bevel gears 101 associated with main drive shaft 21. Cam 99 operates a cam follower 102 at the lower end of an actuating rod 103 which extends upwardly through a bearing 104 in machine frame 19 for pivotal connection to the horizontal arm of a bell crank lever 106. Bell crank 106 is mounted at its center on a shaft 107 which is journalled in the frame 19 so that upon vertical movement of actuating rod 103 the vertical arm of bell crank 106 will move longitudinally of channels 90 and 43. The lower end of the vertical bell crank arm is connected by a pin 108 (Figures 4 and 5) to the web of movable channel 90. In addition, the lower bell crank end is connected by a pin 109 (Figure 1) to a pair of links 111 which are pivotally connected, respectively, to the narrow ends of a pair of generally fan-shaped blade plates 112. The blade plates 112 are mounted in overlapping relation relative to each other and are pivoted at approximately their centers on a shaft 113 which is journaled in frame 19 and operates the can-holding turret 16. At the outer and relatively wide ends of blade plates 112 are mounted the forming blades 92, for example by means of the bolts 114 shown in Figures 4 and 5.

With the above construction it may be seen that pivoting of the bell crank 106 by actuating rod 103 and cam 99 effects concurrent closing of forming blades 92 and shifting of channel 90 to a retracted position, or opening of the forming blades and shifting of channel 90 to a forward position, depending upon the direction of bell crank movement. This shifting of channel 90 is made possible in spite of the passing of shaft 113 through its mid-portion, by a clearance slot 116 (Figures 4 and 5) which prevents any contact between the channel and shaft. When the forming blades are open and the channel forward, as shown in Figure 5, the flanges of channel 90 are in engagement with the corresponding flanges of stationary channel 43 to form a continuation of the rectangular fish passage, and the edges 98 of the forming blades are outwardly adjacent the respective lines of channel engagement. The construction of cam 99, and the lengths of the various pivot and link members, are such that when the actuating rod 103 is elevated to close the forming blades and retract channel 90, the forming blades progressively and substantially completely fill the gaps between the movable and stationary channel flanges until the forming blades are completely closed and the channel 90 completely retracted as shown in Figure 4. It follows that no fish may escape through the gaps between the channel flanges during the forming operation.

Prevention of fish loss from the forming chamber 97 is further assured by a can fill piston disc 117, which forms part of can fill apparatus 15, and by the end portions 118 and 119 of the webs of the respective channels 43 and 90. Referring to Figures 4, 5 and 7, it will be noted that piston disc 117 is directly adjacent the forming chamber at all times except during transfer of a fish charge into a can. The piston disc 117, and the web ends 118 and 119 which are curved to conform to the disc as indicated, effectively prevent any fish loss from the rear of the forming chamber. Prevention of fish loss from the front of the forming chamber is effected by a portion of can-holding turret 16 as will be described in detail subsequently.

As the forming blades 92 close from the position shown in Figure 5 to that of Figure 4, the concave forming blade faces 96 effect molding and forming of the fish from a rectangular or squared end into a semi-cylindrical shape. Because of the change from a squared to a rounded shape, the volume of forming chamber 97 would be progressively reduced if the plunger 91 were maintained stationary during the forming operation. Since this would result in cushing of the fish, so that much of it would be changed from chunk to shredded form and its market value commensurately reduced, the invention provides for the moving of plunger 91 a distance adapted to maintain the volume of forming chamber 97 substantially constant regardless of the positions of forming blades 92. It will be noted, however, that plunger 91 may not be moved the same amount as channel 90 since the forming chamber volume would then be increased and the resulting tuna pack would be excessively loose.

The linkage means 17 (Figures 1 and 2) for adjustably moving the plunger 91 is therefore provided and comprises a vertical yoke 120 mounted over a rectangular block 121 on the end of shaft 107, and a horizontal link 122 pivotally connected at one end to the lower portion of yoke 120 and at the other end to the upper portion of a vertical link 123. Link 123 extends downwardly adjacent an extension of plunger 91 for pivotal connection to an adjustment element 124 which is threaded into frame 19. The mid-portion of link 123 is provided with a pin 126 extending through a vertical slot 127 in plunger 91, and the yoke 120 is provided with a bolt 128 which may be adjusted to permit vertical shifting of the yoke relative to block 121.

The block 121 is keyed or otherwise secured on bell crank shaft 107 so that upon upward shifting of actuating rod 103 to pivot bell crank 106 counterclockwise as viewed in Figure 1, yoke 120 and link 122 will tend to come into alignment with each other. This will tend to rotate vertical link 123 clockwise in Figure 1 so that the pin 126 will shift the associated plunger 91 to the right or outwardly. This movement of plunger 91 is permitted, similarly to the case of movable channel 90, by a slot 131 providing clearance with shaft 113. In order to increase the length of the stroke of plunger 91, the bolt 128 may be loosened and yoke 120 shifted downwardly relative to block 121, so that the effective length of yoke 120 is increased. This will also provide some adjustment of the initial and final positions of plunger 91 since the shifting of yoke 120 on block 121 tends to pivot vertical link 123 slightly. However, the adjustment of the initial and final positions of plunger 91 is primarily effected through rotation of adjustment element 124 to shift the location of the pivot point for the lower end of link 123. The adjustment element 124 also effects a fine adjustment of the length of plunger stroke. Through shifting of yoke 120 on block 121, and turning of element 124, the initial and final positions of plunger 91, as well as the length of the plunger stroke, may be precisely regulated in accordance with the requirements of the charge-forming apparatus 14.

Referring particularly to Figures 4 and 5, and to the time chart of Figure 8, it will be noted that when the forming blades 92 are in their out or open position, the extrusion piston 59 is moving forwardly to transfer a severed mass of fish from receiving chamber 42 and along channel 43 to abut the concave forming surface 94 of plunger 91. The fish abutting the forming surface 94 is, as previously indicated, under the uniform pressure of spring 69 in constant pressure cylinder 61, and is initially formed by surface 94 into semi-cylindrical shape. Through proper design of cam 99, and through proper orientation of the cam and bevel gears 101 relative to drive shaft 21 and to the other elements, the actuating rod 103 is reciprocated once for each revolution of shaft 21 and as indicated on the forming blade circle of Figure 8. The bell crank 106 is then correspondingly pivoted, for example to effect closing of forming blades 92 and retraction of channel 90 and plunger 91, with the channel 90 moving substantially farther than plunger 91 due to the operation of the control linkage 17. As this occurs the end portions 98 of forming blades 92 sever a portion of the fish maintained against surface 94 by extrusion piston 59, and the flanges of channel 90 remain barely out of engagement with blades 92 while preventing loss of fish as previously indicated. The retraction of plunger 91 operates to increase the volume of the forming chamber 97 by an amount approximately equal to the decreased volume effected through closing of the rounded forming blade surfaces 96. The fish is thus molded by the forming blade surfaces 96, and by the plunger surface 94, into the perfect cylinder illustrated in Figure 4. Since the volume in forming chamber 97 is thus maintained substantially constant, there is no crushing of the fish chunks into shreds, but instead is a mere rearrangement of the chunks from a partially squared shape to a perfect cylinder.

To increase the amount of fish placed in each tuna can, it is merely necessary to adjust the control linkage 17 so that the initial position of plunger surface 94 is shifted to the left in Figure 5. The extrusion piston 59 will then place a greater quantity of fish in the path of forming blades 92 and, the final position of plunger surface 94 being the same, a somewhat tighter pack will be produced as may be desired. Conversely, a decreased volume of fish may be achieved by adjusting the initial position of plunger surface 94 so that it is to the right of that shown in Figure 5. The final or retracted position of surface 94 being again the same, through proper adjustment of linkage 17, the resulting pack will be relatively loose upon closing of forming blades 92. It will be noted that the final position of the plunger surface 94 is preferably maintained substantially constant, in order to effect registry of the closed forming chamber 97 with can fill piston 117 and with apertured portions of can-holding turret 16. Although the amount of fish placed in each can may thus be accurately controlled, and the tightness of the pack also regulated, the end of plunger 91 is always initially in a relatively advanced position and in the path of the inner surface of forming blades 92 as shown in dashed lines in Figure 5. The plunger is then retracted out of the way of the forming blades, as they close to the position shown in Figure 4, and serves to prevent any crushing of the fish chunks.

After the forming apparatus has reached the closed position shown in Figure 4, the can-filling apparatus 15 becomes operative to shift the formed charge into the can-holding turret 16 as will next be described. Extrusion piston 59 is then retracted, through operation of cam 65, and the forming apparatus opened to permit the shifting of an additional mass of fish to adjacent the forming apparatus upon subsequent operation of conveyor mechanism 10.

As shown in Figures 1 and 7, the piston disc 117 of can-filling apparatus 15 is of substantially the same diameter as forming chamber 97 and is mounted on a connecting rod 133 which is pivotally associated with a bell crank 134 by means of a spring-loading element 135. Bell crank 134 is pivoted at 136 to machine frame 19, and is operated by a vertical actuating rod 137 which extends downwardly through a bearing 138 to a cam follower 139, the latter being associated with a cam 141 on shaft 21. Referring to Figure 7, the piston disc 117 is mounted in a chamber 142 in frame 19 and, as previously indicated, is directly adjacent the forming chamber 97 at all times except during the can-filling operation. The shape and initial position of cam 141 is such that when the charge-forming apparatus 14 is in the closed position shown in Figure 4, the actuating rod 137 will be elevated to pivot the bell crank 134 on pivot point 136 and thus shift the rod 133 and piston 117 through the forming chamber 97. The formed fish charge is thus shifted, longitudinally of its fibers, into the can-holding turret 16 next to be described, after which the piston 117 retracts and the forming apparatus opens as indicated by the time diagram of Figure 8.

Referring to Figures 1, 2, 6 and 7, the can-holding turret 16 comprises a circular dial plate 143 and co-operating can-holding star 144. Dial plate 143 is formed with four circular holes 145 which are spaced at 90-degree intervals and are of substantially the same diameter as piston disc 117. Star 144 and dial plate 143 are rigidly connected to each other and are keyed on the previously referred to shaft 113, there being a securing bolt 146 threaded through the star 144 and dial plate 143 and into the end of the shaft.

Referring to Figure 7, it will be seen that the dial plate 143 is positioned closely adjacent forming blades 92 and the front edges of channels 43 and 90. The dial plate therefore provides a front closure for the forming chamber 97 at all times except when an aperture 145 is registered with it. While a hole 145 is thus registered, the can-holding star 144 maintains an open-topped tuna can 147 adjacent the hole so that the formed charge in chamber 97 may be shifted by piston 117 through the aperture 145 and into the can. A suitable conveyor, not shown but constructed and arranged in a manner well known to those skilled in conveyor devices, is adapted to transfer the open-topped cans 147 into the top 148 of turret 116, after which they fall into a can pocket adjacent one of the holes 145. Upon subsequent rotation of the turret as will next be described, the cans are intermittently transferred to adjacent forming chamber 97, thence out an exit chute, indicated generally at 149. A suitable spring 151 may be provided as shown in Figure 6 to aid in the positioning of cans 147 in the turret. The spring is mounted in a face plate member 152 which is hinged on a pintle 153 (Figure 2) and is normally maintained in position adjacent the can bottoms by suitable bolts 154 threaded into frame 19.

The entire apparatus for forming and loading the fish charges into cans 147 may be disassembled for cleaning purposes by merely removing bolts 146 and 154. Face plate 152 is then swung out of position and the star 144 and dial plate 143 removed, after which the movable channel 90 and plunger 91 may be removed by merely lifting the channel 90 from its guide slot.

As shown in Figure 1, the mechanism for driving the dial plate 143 and can-holding star 144 for advancement of cans 147 comprises a driven pulley 156 on shaft 113, a belt-connected driving pulley 157, and an intermittent drive 158 associated with pulley 157 by means of a shaft 159. Preferably, the intermittent drive 158 comprises a four star Geneva wheel 161 associated with a double arm 162 containing two spaced pins 163 and 164, the arm 162 being keyed on a shaft 166 driven from main drive shaft 21 by bevel gears 167 having a one-to-one ratio. The operation of the intermittent drive 158, which is only schematically illustrated, is such that when the pin 164 engages Geneva wheel 161 the shaft 159 will be turned a quarter revolution, after which there will be a ninety degree dwell before the pin 163 engages the Geneva wheel to again turn shaft 159 for a quarter turn. Accordingly, the shaft 159 will be rotated, during one full revolution of drive shaft 21, a half revolution at ninety degree intervals spaced by ninety degree dwells. However, the turret 16 is not rotated a quarter revolution along with shaft 159 since pulleys 156 and 157 are of one-to-two ratio, so that the turret rotates only one-eighth turn for each quarter turn of shaft 159.

The operative relationship of the turret 16 and associated parts is such that, as shown in Figure 8, a dial plate hole 145 will be registered with forming chamber 97 only when the forming apparatus 14 is closed as shown in Figure 4. This is referred to as the open position to the turret, since it is then possible for plunger 117 to transfer a fish charge through dial plate hole 145 and into an awaiting can 147. During the closing of the forming apparatus 14 the turret 16 is in a "closed" position, with a solid portion of dial plate 143 opposite forming chamber 97. It follows that during the forming operation the fish in chamber 97 is restrained on one end by piston disc 117, on the other end by a solid portion of dial plate 143, on one semi-cylindrical surface by the end 94 of plunger 91, and on the remaining semi-cylindrical surface by the ends 96 of forming blades 92.

The operation of the fish-canning apparatus will be described with reference to a stationary radius, designated "A" in Figure 8, by figuratively rotating the time diagram counterclockwise as indicated by the arrow. The sequential events for a particular mass of fish may thus be traced, it being understood that various operations occur simultaneously although the cycle is continuous for any particular mass of fish. It will be assumed that at this time a charge of fish has been fed by belt 22 (Figure 3) and through chute 41 into receiving chamber 42, after which the knife blade 48 has closed or descended to sever the fish mass in chamber 42 from the fish fillets 40. Due to the longitudinal positioning of the fish fillets on conveyor belt 22, the fish mass in chamber 42 is positioned so that the fish fibers are transverse to the stationary channel 43, that is to say perpendicular to the surface of knife blade 48. The extrusion piston 59 then moves forwardly to transfer the fish from chamber 42 along channel 43 to the charge-forming apparatus 14, during which time the knife blade 48 is dwelling in the closed position blocking the entrance to chamber 42, and the conveyor belt 22 is stationary as is desired. At the time that the fish mass reaches the forming apparatus 14, the forming blades 92 are in the open position illustrated in Figure 5, so that the fish charge is pressed and shaped by piston 59 against the forming surface 94 of plunger 91, under the constant bias of the spring 69. The forming blades 92 then close to the position shown in Figure 4 and the blade edges 98 sever a portion of the fish mass while isolating it from the remaining mass and from piston 59. The severed portion is molded into a cylinder by the combined action of the blade surfaces 96 and the plunger surface 97. As previously described, the plunger 91 retracts during the forming operation, as does the channel 90, so that no crushing of the fish in chamber 97 occurs and no extrusion of the fish from the forming chamber is possible. At this time the turret 16 is in a closed position, which means that a solid portion of dial plate 143 is adjacent forming chamber 97 as is desired. The turret 16 then indexes to open position, with one of the holes 145 opposite forming chamber 97, after which the can-fill piston 117 moves through the forming chamber 97 and dial plate hole 145 to transfer the formed charge into an awaiting can 147 in the turret. The filled can 147 is then shifted, during subsequent indexing of turret 16, until it reaches the exit chute 149 and is transported from the machine by a suitable conveyor, not shown.

The progress of a single mass of fish from receiving chamber 42 to a can 147 having been traced, the operation of the control system 13, as related to extrusion piston mechanism 12 and conveyor mechanism 10, will be described. At the completion of its forward movement to transfer a mass of fish from chamber 42 to forming apparatus 14, the extrusion piston 59 is at first spaced from the end of channel 43 by a distance somewhat less than that occupied by one charge of fish, the spring 69 then being compressed to provide a uniform fish pressure as previously stated. The cam 85 at the outer end of shaft 60 has then engaged limit switch 83 to operate memory relay 87 and effect immediate closing of electromagnetic clutch 32. The extrusion piston 59 then moves to its return position (Figures 2 and 4) so that no part of the piston or shaft 60 blocks the entrance to receiving chamber 42. The intermittent drive 33 is then operative to rotate shafts 30 and 29, and thus drive conveyor belt 22 to place a new charge of fish in receiving chamber 42, the vertical knife 48 being in its upper open position as indicated. Upon completion of the movement of intermittent drive 33 the cam 86 on shaft 21 engages limit switch 84 to effect opening of clutch 32 and prepare the control for a new cycle of operation. The vertical knife 48 then closes to sever the fish in chamber 42, after which the extrusion piston 59 moves forwardly to transfer the fish charge along channel 43 to the forming apparatus as previously described. Upon repetition of this process the resultant mass of fish adjacent forming chamber 97 will gradually build up since the capacity of forming chamber 97 is slightly less than the capacity of receiving chamber 42 as previously described in detail. It follows that after a number of cycles of operation the resultant fish mass adjacent forming apparatus 14 will block piston 59 and thus shaft 60 before the cam 65 engages limit switch 83. The electromagnetic clutch 32 will therefore not be closed, and the subsequent operation of intermittent drive 33 will not effect further feeding of fish into the receiving chamber 42. However, on the next forward movement of extrusion piston 59 the normal cycle of operation will be resumed since the forming apparatus 14 will by this time have removed a substantial portion of the resultant fish mass previously transferred to it.

It may thus be seen that a method has been evolved which comprises feeding fish to the forming apparatus 14 at a rate slightly greater than its capacity, and periodically interrupting the fish feed to enable the forming apparatus to catch up to the feeding mechanism. More specifically, the method of the invention comprises operating a conveyor belt once for each operation of the forming apparatus, and periodically interrupting the conveyor belt operation upon failure of the extrusion piston to reach a predetermined position due to blocking of its path by the fish adjacent forming apparatus 14.

While the particular method and apparatus herein described in detail are fully capable of attaining the objects and providing the advantages hereinbefore stated, it is to be understood that they are merely illustrative of the presently preferred embodiments of the invention and that no limitations are intended to the details of construction or design herein shown other than as defined in the appended claims.

I claim:
1. In an apparatus for charging fish into a can, means to define a forming surface corresponding to a portion of the side wall of said can, means to transfer a charge of fish into abutment with said surface to conform a portion of said charge thereto, means to form the remainder of said fish charge into a shape corresponding to the complementary portion of the side wall of said can, and means to shift said forming surface and said fish charge a distance sufficient to compensate for variations due to operation of said forming means in the volume of the chamber defined by said forming surface and forming means, said forming surface and forming means cooperating to form said fish charge into the shape of said can while maintaining a large proportion of said fish in naturally adhering condition.

2. In an apparatus for charging chunk tuna fish into a cylindrical can, a plunger having a semi-cylindrical forming surface, means to press a charge of fish against said forming surface to conform a portion of said charge thereto, separate means to form the remainder of said charge into a semi-cylindrical shape, said forming surface and forming means cooperating to form said charge into a cylinder corresponding to said can, and means to move said plunger to compensate for the tendency of said forming means to reduce the volume of the chamber defined by said forming surface and forming means, said forming surface and forming means cooperating to form said fish charge into the shape of said can while maintaining a large proportion of said fish in naturally adhering condition.

3. The invention as claimed in claim 2, wherein said forming means and plunger-moving means operate concurrently to maintain the volume of said chamber substantially constant.

4. In an apparatus for charging chunk tuna fish into a cylindrical can, a plunger having a semi-cylindrical forming surface, means to press a charge of fish against said forming surface to conform a portion of said charge thereto, said pressing means being adapted to maintain the pressure on said fish charge at a substantially constant predetermined value, means to form the remainder of said charge into a semi-cylindrical shape while isolating said charge from said pressing means, said forming surface and forming means cooperating to form said fish charge into a cylinder of approximately the same diameter as said can, and means to retract said plunger away from said forming means ot offset the tendency of said forming means to crush said fish charge and convert the same from chunk to shredded form.

5. The invention as claimed in claim 4, wherein said pressing means comprises a spring-loaded piston, and said remainder of said charge is generally rectangular in shape prior to operation of said forming means.

6. The invention as claimed in claim 4, wherein said forming means comprises a pair of forming blades at the ends of which are concave in the shape of a quadrant of a cylinder, and means to move said blades toward each other both to form said fish charge and to sever said charge from the remainder of a fish mass acted on by said pressing means.

7. In an apparatus for charging chunk tuna fish into a cylindrical can, a plunger having a semi-cylindrical forming surface, means to press a charge of fish against said forming surface to conform a portion of said charge thereto, separate means to form the remainder of said charge into a semi-cylindrical shape, said forming surface and forming means cooperating to form said charge into a cylinder corresponding to said can, means to move said plunger and the fish charge to compensate for the tendency of said forming means to reduce the volume of the chamber defined by said forming surface and forming means, and means to adjust said plunger-moving means to vary the stroke of said plunger.

8. In an apparatus for charging chunk tuna fish into a cylindrical can, a plunger having a semi-cylindrical forming surface, means to press a charge of fish against said forming surface to conform a portion of said charge thereto, said pressing means being adapted to maintain the pressure on said fish charge at a substantially constant predetermined value, means to form the remainder of said charge into a semi-cylindrical shape while isolating said charge from said pressing means, said forming surface and forming means cooperating to form said fish charge into a cylinder of approximately the same diameter as said can, means to retract said plunger away from said forming means during operation of said forming means on said remainder of said charge, and means to adjust said plunger-retracting means to vary the initial forward position of said plunger while maintaining the final retracted position thereof substantially constant, said adjustment means being operable to vary the amount of fish in said charge and the tightness of the pack in said can.

9. The invention as claimed in claim 8, wherein said plunger-retracting means includes a linkage; and said adjustment means comprises means to vary a pivot point in said linkage, and separate means to vary the effective length of one of the links in said linkage.

10. In an apparatus for charging fish into a cylindrical can, means forming a substantially semi-cylindrical concave forming surface, a pair of forming blades the end portions of which are each concave to form a quadrant of a cylinder, said forming surface and blade end portions cooperating when said blades are in closed position to form a cylinder of substantially the same diameter as that of said can, and means to move said blades in opposite directions and generally parallel to a plane containing the forward edges of said forming surface, said blade-moving means alternately operating to move said blades from said closed position to an open position permitting shifting of a fish charge into engagement with said forming surface, and from said open position to closed position to effect shaping of said fish charge into cylindrical form.

11. The invention as claimed in claim 10, wherein said fish charge is shifted into engagement with said forming surface by a constant pressure piston, and said forming blades have cutting edges adapted to come into substantial engagement upon closing of said blades to sever said fish charge from the remainder of a fish mass acted on by said piston.

12. The invention as claimed in claim 11, wherein adjustable means are provided to retract said forming surface during closing of said blades a distance sufficient to prevent crushing of said fish charge.

13. The invention as claimed in claim 12, wherein said constant pressure piston operates in a passage of rectangular transverse section, and said fish charge is transferred along said passage to said forming surface in a direction transverse to its fibers.

14. In an apparatus for canning fish, stationary means to define a fish passage, movable means to form a continuation of said fish passage, means providing a forming surface in said movable means and spaced from said stationary means, means to transfer a mass of fish through said fish passage and said continuation to adjacent said forming surface, forming blade means movable transversely of said passage to sever the fish in said movable means from the fish in said stationary means, said forming blade means cooperating with said forming surface to form the fish in said movable means into the shape of a can, and means to retract said movable means in timed relation to the movements of said forming blade means, said retracting means being adapted to prevent interfering contact between said formnig blade means and movable means while preventing loss of fish from said passage.

15. In an apparatus for canning fish, stationary means to define a fish passage, movable means to form a continuation of said fish passage, means providing a forming surface in said movable means and spaced from said stationary means, means to transfer a mass of fish through said fish passage and said continuation to adjacent said forming surface, forming blade means movable transversely of said passage to sever the fish in said movable means from the fish in said stationary means, said forming blade means cooperating with said forming surface to form the fish in said movable means into the shape of a can, means to retract said movable means at a rate barely sufficient to prevent interfering engagement of said forming blade means and movable means, and means to retract said forming surface at a different rate sufficient to prevent crushing of the fish due to operation of said forming blade means.

16. In an apparatus for charging chunk tuna fish into a cylindrical can, stationary means to define a fish passage of rectangular transverse section, movable means to form a continuation of said fish passage, a plunger slidably mounted in said movable means and having its end adjacent said stationary means concave in the form of a semicylinder, means to dispose a mass of tuna fish in said fish passage and with the fish fibers transverse thereto, a constant pressure piston mounted to transfer said fish mass along said passage and continuation and into engagement with said plunger end, a pair of forming blades movable in opposite directions transversely of said passage from a closed position between said stationary means and plunger to an open position permitting said transfer of said fish mass to said plunger, said forming blades having ends shaped to sever the fish mass in said movable means from the fish mass in said stationary means and additionally to cooperate with said plunger end in forming said severed fish mass into cylindrical shape, means to retract said movable means in timed relation to the movements of said forming blades at a rate barely sufficient to prevent interfering contact therebetween, and means to retract said plunger at a lesser rate sufficient to prevent crushing of said severed fish mass by said forming blades.

17. The invention claimed in claim 16, wherein means are provided to adjust the initial position of said plunger relative to the path of movement of said forming blades, to thereby regulate the quantity of fish severed by said forming blades for charging into a can.

18. The invention as claimed in claim 16, wherein can-holding means are provided adjacent one side of said plunger and forming blades, means are provided to operate said can-holding means so that a solid wall portion thereof is adjacent said severed fish mass during forming and an apertured can-holding portion is adjacent said mass subsequent to forming and while said forming blades are in closed position, and piston means are provided adjacent the other side of said plunger and forming blades to transfer the severed and formed fish mass into said can while said forming blades are in closed position.

19. In a fish-canning apparatus, charge-forming means, a fish-receiving chamber, piston means movable once for each operation of said charge-forming means from a retracted position on the side of said chamber remote from said charge-forming means to a forward position adjacent said charge-forming means to thereby transfer any fish in said chamber to said charge-forming means, means responsive to the amount of fish adjacent said charge-forming means for determining the forward position of said piston means, means to feed fish to said receiving chamber once for each operation of said charge-forming means, and means responsive to the forward position of said piston means to interrupt the operation of said feeding means periodically.

20. The invention as claimed in claim 19, wherein said piston means is spring-loaded to exert a constant pressure on said fish and permit variations in said forward position.

21. The invention as claimed in claim 19, wherein the said fish transfer means includes for transferring toward said charge-forming means during each of its operations an amount of fish which is slightly greater than the amount of fish used to form a charge for filling a can whereby periodic operation of said interrupting means is assured.

22. In a fish-canning apparatus, charge-forming means, a fish-receiving chamber, piston means movable from a retracted position on the side of said chamber remote from said charge-forming means to a forward position adjacent said charge-forming means to transfer any fish in said chamber to said charge-forming means, said forward position of said piston means being determined by the amount of fish adjacent said charge-forming means, means to convey fish to said receiving chamber, means including an electromagnetic clutch and an intermittent drive to operate said conveyor means, and a limit switch associated with said piston means and clutch, said limit switch being engaged to close said clutch when said piston means is in a predetermined forward position relatively adjacent said charge-forming means; said intermittent drive and piston means being constructed and arranged to cause, while said clutch is in closed condition, operation of said conveyor means only after return of said piston means to said retracted position.

23. The invention as claimed in claim 22, wherein means are provided to maintain said clutch in closed condition after disengagement of said limit switch, and separate limit switch means are provided to effect opening of said clutch after operation of said conveyor means.

24. Apparatus for canning fish, comprising a fish-receiving chamber, a movable plunger spaced from said chamber, the portion of said plunger adjacent said chamber being shaped with a forming surface, means to move said plunger in a direction away from said chamber from an initial position to a retracted position, piston means to transfer a fish mass from said receiving chamber into abutment with said forming surface when said plunger is in said initial position, means cooperating with said forming surface to form a portion of said fish mass into can shape, means to convey fish to said chamber, and control means associated with said piston means to interrupt the operation of said conveyor means in response to an excess of fish adjacent said forming surface.

25. Apparatus for canning fish, which comprises conveyor means for conveying a first predetermined quantity of fish to a filling station, forming means for forming a major portion of said first quantity into a second predetermined quantity having the shape of said can, charging means for charging said formed fish into a can, means for advancing another can to said filling station and for withdrawing a newly filled can, means for effecting sequential repetition of the operations of said conveyor, forming, charging and can advancing means, with substantially equal quantities of fish, and means responsive to a predetermined excess of fish adjacent said forming means for interrupting operation of said conveyor means for at least one can charging cycle of operation.

26. Apparatus for canning fish, which comprises severing and forming means adapted to sever and form a first predetermined quantity of fish into the shape of a can, charging means for charging said severed and formed fish into a can at a filling station, means for advancing a second and identical can to said filling station as a filled can is withdrawn, conveyor means for conveying a second predetermined quantity of fish to said severing and forming means, said second predetermined quantity being slightly greater than said first predetermined quantity, means for effecting sequential repetition of the operations of all of said means until there is a quantity of fish in excess of that required to fill the next can adjacent said severing and forming means, and means for interrupting operation of said conveyor means for a single can-filling cycle for the purpose of reducing the quantity of said excess ready for charging into cans.

27. That method of charging substantially equal quantities of fish into cans in rapid sequence which comprises, advancing a series of open-topped cans past a filling station, advancing a stream of closely compacted fish fillets toward said filling station with said fillets extending in the same direction, severing said stream crosswise to form layers having a thickness corresponding to the height of said cans, advancing said severed layers sequentially across the open ends of said cans at said filling station, forming a predetermined portion of a given layer into a charge conforming in shape to that of a can and shifting the charge axially into a can, merging the residue of the layer with the next following layer to form a charge for the next can of said series, and periodically discontinuing the advance of a newly severed fish layer to use excess fish from preceding layers to fill a can.

28. That method of charging substantially equal quantities of fish into cans in rapid sequence which comprises, advancing a series of open-topped cans past a filling station, advancing a stream of closely compacted fish fillets toward said filling station with said fillets extending in the same direction, severing said stream crosswise to form layers having a thickness corresponding to the height of said cans, advancing said severed layers in edge-to-edge relation toward said filling station, merging the residue from a preceding can-filling operation with the foremost one of said advancing layers to form a charge for the next can to be filled, separating a predetermined quantity of fish therefrom and charging the same into a can at said charging station, and momentarily discontinuing the severing of a new layer while excess residue from preceding can filling operations has been utilized to fill at least one can before resuming a layer-severing operation for each can-filling operation.

29. That method of charging substantially equal quantities of fish into cans in rapid sequence which comprises, advancing a series of open-topped cans past a filling station, advancing a stream of closely compacted fish fillets toward said filling station in a direction traversing the plane of advance of said series of cans, severing layers of fish from said stream having a thickness corresponding to the depth of said cans, shifting said layers in edge-to-edge relation toward said filling station with one face of the foremost layer lying substantially flush with the open end of the next can to be filled, forming a charge of fish therefrom while said layer is held under a predetermined pressure independently of that utilized to shift said layers toward said filling station, transferring said charge into the can, and merging the residue from each preceding can-filling operation with the advancing layer for the next can whereby all portions of said stream of fillets is charged into said cans with the fish fibers arranged in substantially parallel relation lengthwise of the cans.

30. That method of charging substantially equal quantities of fish into cans in rapid sequence which comprises, advancing a series of open-topped cans past a filling station, advancing a stream of closely-compacted longitudinally-arranged fish fillets toward said filling station, severing said stream transversely to form layers having a thickness corresponding to the depth of said cans, advancing said layers in a line such that one face of said layers lies parallel to and closely adjacent the open end of said cans as the same reach said filling station, confining said line of advancing fish layers to a transverse width not substantially in excess of the diameter of said cans, maintaining said advancing fish layers under a predetermined pressure lengthwise of the path of advance independently of the force used to advance said layers toward said filling station, forming a predetermined charge of fish from the foremost end of said advancing line of fish layers, and placing said charge into a can with the fish fibers extending lengthwise of said can.

31. That method of packing fish fillets in cans which comprises slicing longitudinally arranged fillets transversely in slices of equal thickness while holding all portions of said slices compacted together, transferring said slices laterally in edge-to-edge relation toward a can filling station, holding said layers compacted against one another in said edge-to-edge relation under a substantially uniform predetermined pressure applied independently of the force utilized to transfer said slices toward a can filling station, forming equal volume charges in sequence from the foremost end of said slices, and transferring each charge to a separate can with the longitudinal fibers of the fish extending axially thereof.

32. A method of canning fish, comprising conveying a first predetermined quantity of fish to a can filling station, forming a major portion of said first quantity into a predetermined charge having the shape of a container therefor, charging said formed portion into said container at said filling station, conveying a second and substantially identical quantity of fish as said first quantity to said filling station along with the remainder of said first quantity, forming a portion of the resultant fish quantity into a charge having the shape and substantially equal in volume to that charged into said first mentioned container, charging said formed portion into a second container at said filling station, repeating the above steps until the resultant fish quantity adjacent the filling station increases to a predetermined size, and then omitting the conveying step during one cycle while performing the forming and container filling steps for the purpose of reducing the size of said resultant quantity and then repeating the described steps.

33. A method of canning fish in a repeating cycle of operations, comprising forming a closely compacted stream of fish fillets arranged generally parallel to each other, feeding said stream of fillets in a direction longitudinally of the fish fibers, severing a predetermined quantity of fish from said fillets transversely of the fish fibers, shifting said severed quantity in a direction transversely of the fish fibers to a can filling station, severing a predetermined amount of said quantity longitudinally of the fish fibers, said predetermined amount constituting a major portion of said quantity, forming said severed amount into the shape of said can, charging said severed and formed amount into said first can, and repeating all of the above steps sequentially to fill a series of cans until the resultant quantity increases to an amount in excess of that required to fill another can, and then omitting the fillet-feeding step for at least one cycle of operation.

References Cited in the file of this patent

UNITED STATES PATENTS

| | | |
|---|---|---|
| 676,761 | Morris | June 18, 1901 |
| 1,358,255 | Seufer et al. | Nov. 9, 1920 |
| 2,037,724 | Jacobs et al. | Apr. 21, 1936 |
| 2,044,813 | Rooney | June 23, 1936 |
| 2,411,188 | Borg | Nov. 19, 1946 |
| 2,540,272 | Malmstrom et al. | Feb. 6, 1951 |
| 2,542,133 | Gorby | Feb. 20, 1951 |
| 2,575,703 | Carruthers | Nov. 20, 1951 |
| 2,601,093 | Carruthers | June 17, 1952 |
| 2,630,390 | Carruthers | Mar. 3, 1953 |
| 2,635,050 | Stevenson et al. | Apr. 14, 1953 |
| 2,641,094 | Starzyk | June 9, 1953 |
| 2,715,490 | Carruthers | Aug. 16, 1955 |

UNITED STATES PATENT OFFICE
CERTIFICATE OF CORRECTION

Patent No. 2,926,095                February 23, 1960

Jack Gorby

It is hereby certified that error appears in the printed specification of the above numbered patent requiring correction and that the said Letters Patent should read as corrected below.

Column 4, line 73, after "adapted" insert -- to be operated --.

Signed and sealed this 9th day of August 1960.

(SEAL)
Attest:
KARL H. AXLINE
Attesting Officer

ROBERT C. WATSON
Commissioner of Patents